(12) United States Patent
Gustafson (10) Patent No.: US 7,572,214 B2
(45) Date of Patent: Aug. 11, 2009

(54) SUCTION ROLL WITH SENSORS FOR DETECTING OPERATIONAL PARAMETERS HAVING APERTURES

(75) Inventor: Eric J. Gustafson, Stevens City, VA (US)

(73) Assignee: Stowe Woodward L.L.C., Middletown, VA (US)

( * ) Notice: Subject to any disclaimer, the term of this patent is extended or adjusted under 35 U.S.C. 154(b) by 694 days.

(21) Appl. No.: 11/121,577

(22) Filed: May 4, 2005

(65) Prior Publication Data

US 2006/0248723 A1 Nov. 9, 2006

(51) Int. Cl.
*B05C 1/08* (2006.01)
*B21K 5/02* (2006.01)

(52) U.S. Cl. ................ 492/9; 492/10; 492/20; 162/358.1

(58) Field of Classification Search ........... 492/9, 492/10, 11, 20, 56; 162/358.1, 372; 100/99
See application file for complete search history.

(56) References Cited

U.S. PATENT DOCUMENTS

| | | | |
|---|---|---|---|
| 2,815,907 A * | 12/1957 | McCormick | 242/333.2 |
| 3,308,476 A * | 3/1967 | Kleesattel | 73/573 |
| 3,562,883 A | 2/1971 | Kobayashi | |
| 3,665,650 A * | 5/1972 | Przygocki | 451/1 |
| 3,962,911 A | 6/1976 | Grenlund | |
| 4,016,756 A | 4/1977 | Kunkle | |
| 4,233,011 A | 11/1980 | Bolender et al. | |
| 4,366,025 A | 12/1982 | Gordon, Jr. et al. | |
| 4,445,349 A | 5/1984 | Eibe | |
| 4,498,383 A | 2/1985 | Pav et al. | |
| 4,509,237 A | 4/1985 | Volz et al. | |
| 4,729,153 A | 3/1988 | Pav et al. | |
| 4,871,908 A | 10/1989 | Skuratovsky et al. | |
| 4,898,012 A | 2/1990 | Jones et al. | |
| 4,903,517 A | 2/1990 | Van Haag et al. | |
| 4,910,985 A | 3/1990 | Ballyns | |

(Continued)

FOREIGN PATENT DOCUMENTS

DE 863133 1/1953

(Continued)

OTHER PUBLICATIONS

A Study of Rubber Covered Press Nip Dynamics, James P. McNamee The Journal of the Technical Association of the Pulp and Paper Industry, vol. 48, No. 12, Dec. 1965, pp. 673-679.

(Continued)

*Primary Examiner*—Essama Omgba
(74) *Attorney, Agent, or Firm*—Myers Bigel Sibley & Sajovec (57) ABSTRACT

An industrial roll includes: a substantially cylindrical shell having an outer surface and an internal lumen; a polymeric cover circumferentially overlying the shell outer surface; and a sensing system. The sensing system comprises: a plurality of sensors embedded in the cover, the sensors configured to sense an operating parameter of the roll and provide signals related to the operating parameter, wherein at least some of the sensors include an aperture; and a processor operatively associated with the sensors that processes signals provided by the sensors. In some embodiments the shell and cover include through holes that extend through the sensor apertures.

22 Claims, 5 Drawing Sheets

U.S. PATENT DOCUMENTS

| | | | |
|---|---|---|---|
| 4,938,045 A | | 7/1990 | Rosenstock et al. |
| 5,048,353 A | | 9/1991 | Justus |
| 5,086,220 A | | 2/1992 | Berthold et al. |
| 5,379,652 A | | 1/1995 | Allonen |
| 5,383,371 A | | 1/1995 | Laitinen |
| 5,466,343 A | | 11/1995 | Kankaanpaa |
| 5,562,027 A | | 10/1996 | Moore |
| 5,592,875 A | * | 1/1997 | Moschel ............... 100/99 |
| 5,684,912 A | | 11/1997 | Slaney et al. |
| 5,699,729 A | * | 12/1997 | Moschel ............... 100/99 |
| 5,915,648 A | | 6/1999 | Madrzak et al. |
| 5,925,220 A | | 7/1999 | Hirsch et al. |
| 5,947,401 A | * | 9/1999 | Niccum ............... 242/334 |
| 5,953,230 A | * | 9/1999 | Moore ............... 700/122 |
| 6,284,103 B1 | | 9/2001 | Eng et al. |
| 6,341,522 B1 | * | 1/2002 | Goss et al. ............... 73/159 |
| 6,354,013 B1 | * | 3/2002 | Mucke et al. ............ 33/533 |
| 6,361,483 B1 | | 3/2002 | Kirchner |
| 6,441,904 B1 | * | 8/2002 | Shakespeare ........... 356/429 |
| 6,752,908 B2 | | 6/2004 | Gustafson |
| 6,892,563 B2 | * | 5/2005 | Gustafson et al. ........... 73/1.14 |
| 6,910,376 B2 | * | 6/2005 | Maenpaa ............... 73/159 |
| 6,981,935 B2 | * | 1/2006 | Gustafson ............... 492/10 |
| 6,988,398 B2 | * | 1/2006 | Saloniemi et al. ........... 73/159 |
| 7,185,537 B2 | * | 3/2007 | Muhs ............... 73/159 |
| 7,225,688 B2 | * | 6/2007 | Moore et al. ............ 73/862.55 |
| 2004/0053758 A1 | | 3/2004 | Gustafson |

FOREIGN PATENT DOCUMENTS

| | | | |
|---|---|---|---|
| DE | 199 20 133 | | 11/2000 |
| EP | 1719836 A1 | * | 11/2006 |
| FR | 2 769 379 | | 4/1999 |
| WO | WO 96/34262 | | 10/1996 |
| WO | WO 01/53787 | | 7/2001 |

OTHER PUBLICATIONS

Anonymous: "*Les Capteurs a Fibres Optiques Operationnels?*" vol. 51, No. 13 (Oct. 20, 1986) pp. 49-51, 53, 55 XP002083807.

Embedded Strain Gages for the Measurement of Strains in Rolling Contact, A. Bazergui and M. L. Meyer, Experimental Mechanics, Oct. 1968, pp. 433-441.

Experimental Investigation of Rolling Contact, Aris C. Spengos Journal of Applied Mechanics, Dec. 1965, pp. 859-864.

International Search Report for PCT/US01/02013.

Knowles, S.F. et al; "*Multiple microbending optical-fibre sensors for measurement of fuel quantity in aircraft fuel tanks*;" vol. 68, No. 1-3 (Jun. 15, 1998) pp. 320-323. XP004139852.

McCollum, T et al; "*Fiber optic microbend sensor for detection of dynamic fluid pressure at gear interfaces.*" vol. 65, No. 3, (Mar. 1, 1994) pp. 724-729 XP000435198.

Measurement of the Pressure-Time Profile in a Rolling Calendar Nip, Samuel F. Keller, 77th Annual Meeting of the Canadian Section of the Pulp and Paper Assn., 1991, pp. B89-B96.

Measurements of pressure distribution between metal and rubber covered rollers, G. J. Parish, British Journal of Applied Pyhsics, vol. 9, Apr. 1958, pp. 158-161.

Soft Calendar Nip: an interesting subject for research and Measurement, J. Koriseva et al., Paper and Timber, 73(1991):5 pp. 419-423.

PCT International Search Report PCT/US03/18895.

Transducers and Techniques of Contact Pressure Measurement, Terry L. Merriman, The Society for Experimental Mechanics, Spring Conference, Jun. 1991, pp. 318-320.

European Search Report for EP 05 02 7237, dated Aug. 29, 2006.

\* cited by examiner

SUCTION ROLL WITH SENSORS FOR DETECTING OPERATIONAL PARAMETERS HAVING APERTURES

FIELD OF THE INVENTION

The present invention relates generally to industrial rolls, and more particularly to rolls for papermaking.

BACKGROUND OF THE INVENTION

Cylindrical rolls are utilized in a number of industrial applications, especially those relating to papermaking. Such rolls are typically employed in demanding environments in which they can be exposed to high dynamic loads and temperatures and aggressive or corrosive chemical agents. As an example, in a typical paper mill, rolls are used not only for transporting a fibrous web sheet between processing stations, but also, in the case of press section and calender rolls, for processing the web sheet itself into paper.

A papermaking machine may include one or more suction rolls placed at various positions within the machine to draw moisture from a belt (such as a press felt) and/or the fiber web. Each suction roll is typically constructed from a metallic shell covered by a polymeric cover with a plurality of holes extending radially therethrough. Vacuum pressure is applied with a suction box located in the interior of the suction roll shell. Water is drawn into the radially-extending holes and is either propelled centrifugally from the holes after they pass out of the suction zone or transported from the interior of the suction roll shell through appropriate fluid conduits or piping. The holes are typically formed in a grid-like pattern by a multi-bit drill that forms a line of multiple holes at once (for example, the drill may form fifty aligned holes at once). In many grid patterns, the holes are arranged such that rows and columns of holes are at an oblique angle to the longitudinal axis of the roll.

As the paper web is conveyed through a papermaking machine, it can be very important to understand the pressure profile experienced by the paper web. Variations in pressure can impact the amount of water drained from the web, which can affect the ultimate sheet moisture content, thickness, and other properties. The magnitude of pressure applied with a suction roll can, therefore, impact the quality of paper produced with the paper machine.

Other properties of a suction roll can also be important. For example, the stress and strain experienced by the roll cover in the cross machine direction can provide information about the durability and dimensional stability of the cover. In addition, the temperature profile of the roll can assist in identifying potential problem areas of the cover.

It is known to include pressure and/or temperature sensors in the cover of an industrial roll. For example, U.S. Pat. No. 5,699,729 to Moschel et al. describes a roll with a helically-disposed fiber that includes a plurality of pressure sensors embedded in the polymeric cover of the roll. However, a suction roll of the type described above presents technical challenges that a conventional roll does not. For example, suction roll hole patterns are ordinarily designed with sufficient density that some of the holes would overlie portions of the sensors. Conventionally, the sensors and accompanying signal carrier (e.g., a fiber or cable) are applied to the metallic shell prior to the application of the polymeric cover, and the suction holes are drilled after the application and curing of the cover. Thus, drilling holes in the cover in a conventional manner would almost certainly damage the sensors, and may well damage the signal carrier. Also, during curing of the cover often the polymeric material shifts slightly on the core, and in turn may shift the positions of the signal carrier and sensors; thus, it is not always possible to determine precisely the position of the signal carrier and sensors beneath the cover, and the shifting core may move a sensor or signal carrier to a position directly beneath a hole. Further, ordinarily optical fiber has a relative high minimum bending radius for suitable performance; thus, if optical fiber is employed as the signal carrier, trying to weave an optical fiber between prospective holes in the roll may result in unacceptable optical transmission within the fiber.

One approach to the use of sensors in a suction roll is described in U.S. Patent Publication No. 20040053758, proposes that the signal carrier trace a path that follows the oblique angle of the suction roll drill pattern. This arrangement enables the signal carrier to be applied to the base layer of the roll cover prior to the application of the outer layer cover but still avoid damage to the signal carrier during drilling of the drainage holes. However, in some embodiments the sensor may be sufficiently large that it does not fit within the spaces between drainage holes. In such instances, a blind drilled hole may be formed over the sensor rather than a through hole so that the hole pattern in the cover is not disturbed. However, this solution may not be optimal for all roll covers.

SUMMARY OF THE INVENTION

The present invention can address some of the issues raised by prior suction rolls. As a first aspect, embodiments of the present invention are directed to an industrial roll, comprising: a substantially cylindrical shell having an outer surface and an internal lumen; a polymeric cover circumferentially overlying the shell outer surface; and a sensing system. The sensing system comprises: a plurality of sensors embedded in the cover, the sensors configured to sense an operating parameter of the roll and provide signals related to the operating parameter, wherein at least some of the sensors include an aperture; and a processor operatively associated with the sensors that processes signals provided by the sensors.

In some embodiments, the shell and roll cover include through holes that provide fluid communication between the shell lumen and the atmosphere. In additional embodiments, the sensors are positioned such that the through holes of the cover extend through the sensor apertures. In other embodiments, the sensor apertures are internal apertures. In further embodiments, the sensors are piezoelectric sensors.

As a second aspect, embodiments of the present invention are directed to an industrial roll comprising: a substantially cylindrical shell having an outer surface and an internal lumen; a polymeric cover circumferentially overlying the shell outer surface, wherein the shell and cover have a plurality of through holes that provide fluid communication between the lumen and the atmosphere; and a sensing system. The sensing system comprises: a plurality of sensors contacting the cover, the sensors configured to sense an operating parameter of the roll and provide signals related to the operating parameter, wherein at least some of the sensors include an aperture, wherein some of the through holes of the cover extend through respective apertures of the sensors; and a processor operatively associated with the sensors that processes signals provided by the sensors.

As a third aspect, embodiments of the present invention are directed to an industrial roll comprising: a substantially cylindrical shell having an outer surface and an internal lumen; a polymeric cover circumferentially overlying the shell outer surface, wherein the shell and cover have a plurality of through holes that provide fluid communication between the lumen and the atmosphere; and a sensing system. The sensing system comprises a plurality of piezoelectric sensors embedded in the cover, the sensors configured to sense an operating parameter of the roll and provide signals related to the operating parameter, wherein at least some of the sensors include an internal aperture, wherein some of the through holes of the cover extend through respective internal apertures of the sensors; and a processor operatively associated with the sensors that processes signals provided by the sensors.

DETAILED DESCRIPTION OF EMBODIMENTS OF THE INVENTION

The present invention will be described more particularly hereinafter with reference to the accompanying drawings. The invention is not intended to be limited to the illustrated embodiments; rather, these embodiments are intended to fully and completely disclose the invention to those skilled in this art. In the drawings, like numbers refer to like elements throughout. Thicknesses and dimensions of some components may be exaggerated for clarity.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. As used herein, the term "and/or" includes any and all combinations of one or more of the associated listed items. Where used, the terms "attached", "connected", "interconnected", "contacting", "coupled", "mounted" and the like can mean either direct or indirect attachment or contact between elements, unless stated otherwise.

Figure 1:
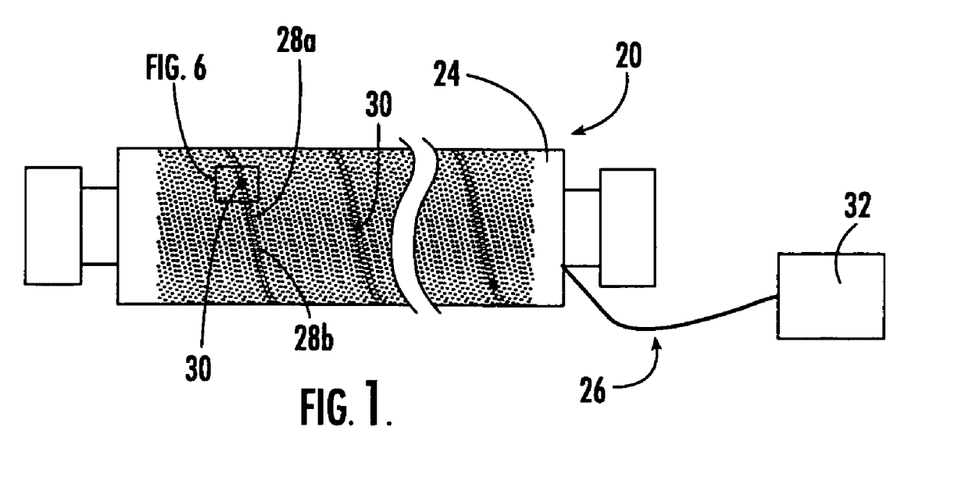
FIG. 1 is a gage view of a suction roll and detecting system of the present invention.

Referring now to the figures, a suction roll, designated broadly at 20, is illustrated in FIG. 1. The suction roll 20 includes a hollow cylindrical shell or core 22 (see FIG. 2) and a cover 24 (typically formed of one or more polymeric materials) that encircles the shell 22. A sensing system 26 for sensing pressure, temperature, moisture, or some other operational parameter of interest includes a pair of leads 28a, 28b and a plurality of sensors 30, each of which is embedded in the cover 24. As used herein, a sensor being "embedded" in the cover means that the sensor is either entirely contained within the cover or it is mounted on the core and completely covered by the cover. The sensing system 26 also includes a processor 32 that processes signals produced by the sensors 30.

Figure 2:
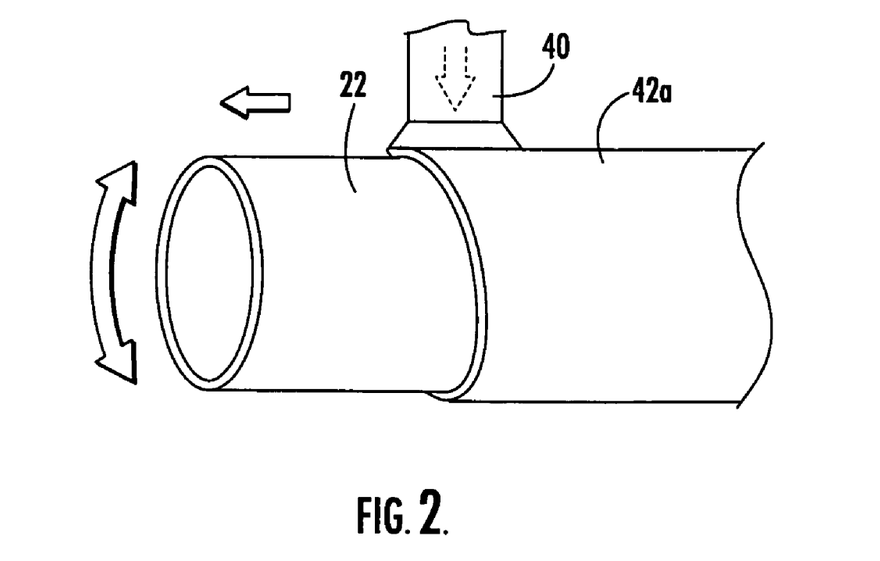
FIG. 2 is a gage perspective view of a shell and an inner base layer formed in the manufacture of the suction roll of FIG. 1.

The shell 22 is typically formed of a corrosion-resistant metallic material, such as stainless steel or bronze. A suction box (not shown) is typically positioned within the lumen of the shell 22 to apply negative pressure (i.e., suction) through holes in the shell 22 and cover 24. Typically, the shell 22 will already include through holes that will later align with through holes 82 in the cover 24. An exemplary shell and suction box combination is illustrated and described in U.S. Pat. No. 6,358,370 to Huttunen, the disclosure of which is hereby incorporated herein in its entirety.

Figure 7A:
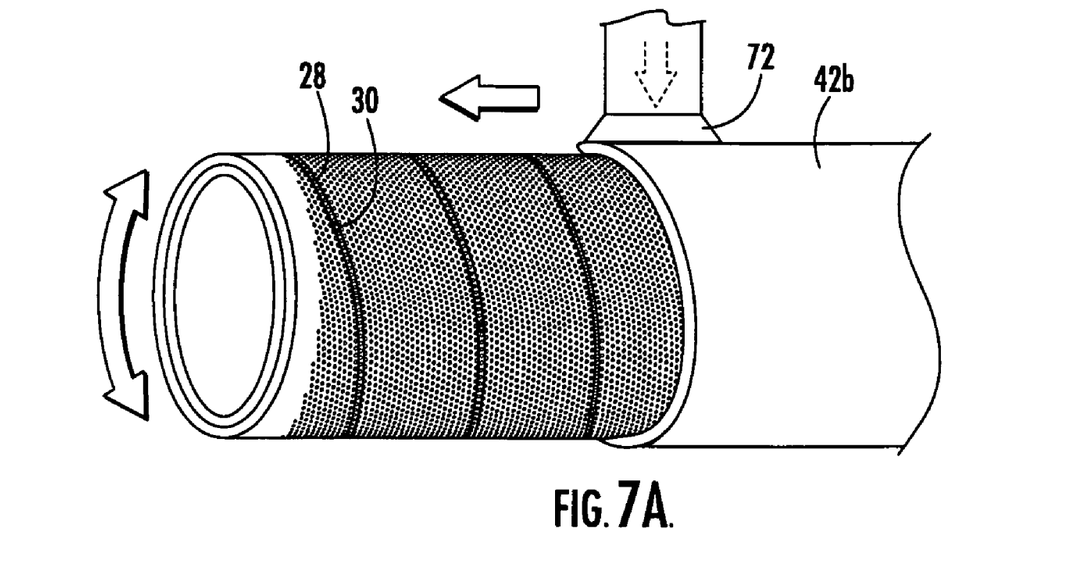
FIG. 7A is a gage perspective view of the outer base layer being applied over the inner base layer, cables and sensors of FIGS. 5 and 6.
Figure 7B:
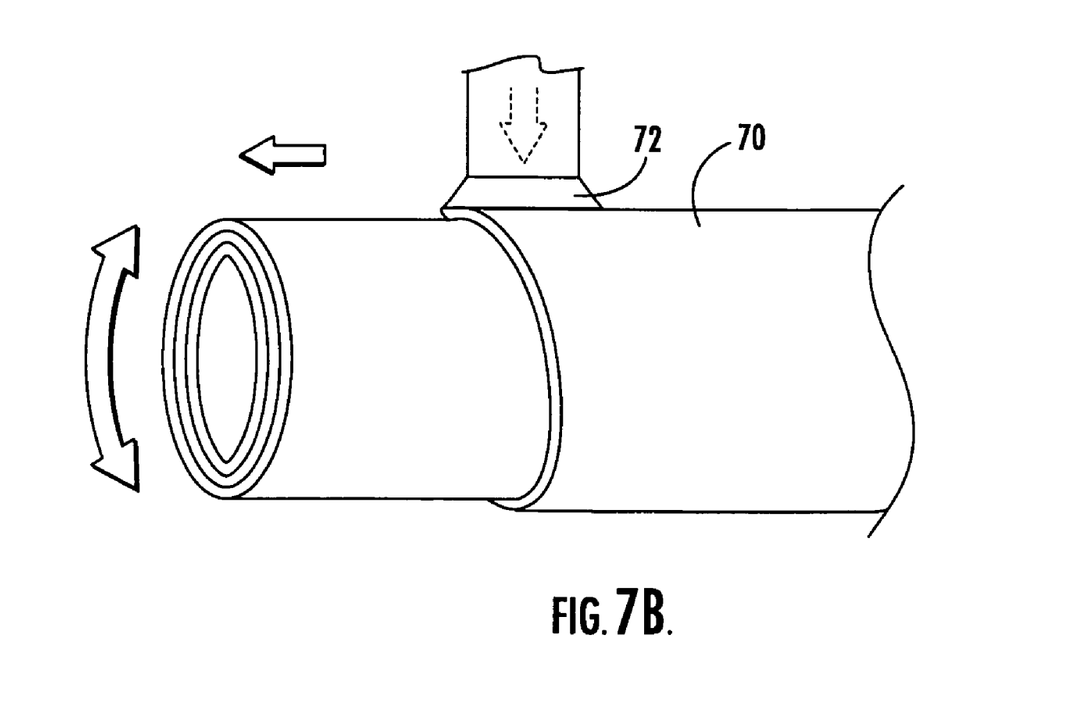
FIG. 7B is a gage perspective view of the topstock layer being applied over the outer base layer of FIG. 7A.

The cover 24 can take any form and can be formed of any polymeric and/or elastomeric material recognized by those skilled in this art to be suitable for use with a suction roll. Exemplary materials include natural rubber, synthetic rubbers such as neoprene, styrene-butadiene (SBR), nitrile rubber, chlorosulfonated polyethylene ("CSPE"—also known under the trade name HYPALON), EDPM (the name given to an ethylene-propylene terpolymer formed of ethylene-propylene diene monomer), epoxy, and polyurethane. In many instances, the cover 24 will comprise multiple layers. FIGS. 2, 7A and 7B illustrate the application of an inner base layer 42a, an outer base layer 42b and a topstock layer 70; additional layers, such as a "tie-in" layer between the base and topstock layers 42a, 42b, 70 and an adhesive layer between the shell 22 and the inner base layer 42, may also be included). The cover 24 may also include reinforcing and filler materials, additives, and the like. Exemplary additional materials are discussed in U.S. Pat. No. 6,328,681 to Stephens and U.S. Pat. No. 6,375,602 to Jones and U.S. Patent Publication No. 20040053758, the disclosures of each of which are hereby incorporated herein in their entireties.

Figure 6:
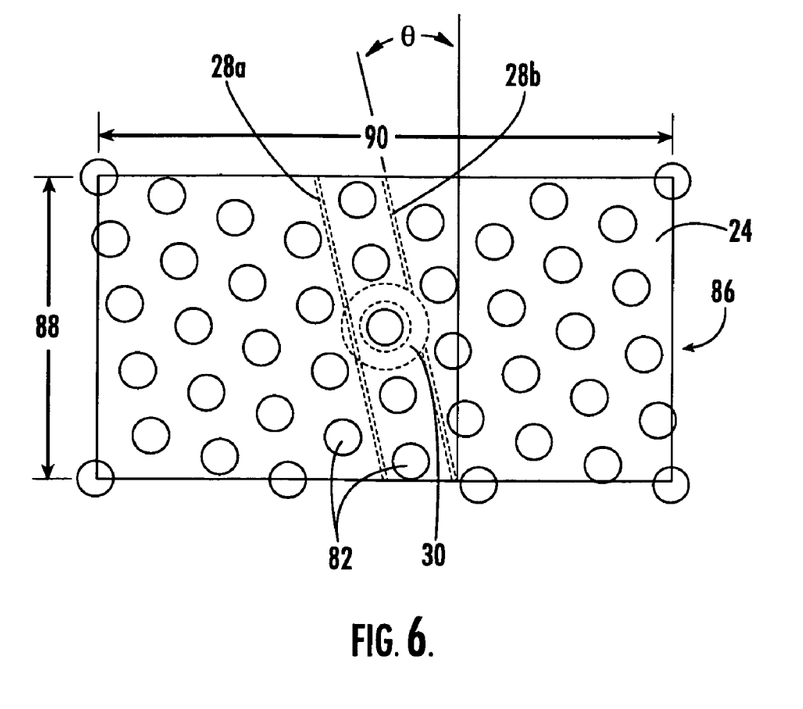
FIG. 6 is a greatly enlarged gage view of cables and sensor of FIG. 5 positioned in the grooves formed in the cover base layer as shown in FIG. 4, with the sensor positioned to encircle one of the scored circles formed in the scoring procedure shown in FIG. 3.

The cover 24 has a pattern of holes (which includes through holes 82 and may also include blind drilled holes) that may be any of the hole patterns conventionally employed with suction rolls or recognized to be suitable for applying suction to an overlying papermaker's felt or fabric and/or a paper web as it travels over the roll 20. Typically, the holes are between about 0.060 and 0.250 inches in diameter and are spaced to be about 0.060 to 0.375 inches from one another. A base repeat unit 86 of one exemplary hole pattern is illustrated in FIG. 6. The repeat unit 86 can be defined by a frame 88 that represents the height or circumferential expanse of the pattern (this dimension is typically about 0.5 to 1.5 inches) and a drill spacing 90 that represents the width or axial expanse of the pattern (this dimension is typically about 1.0 to 3.0 inches). As is conventional, the columns of holes 82 define an oblique angle θ (typically between about 5 and 20 degrees) relative to a plane that is perpendicular to the longitudinal axis of the roll 20.

Figure 5:
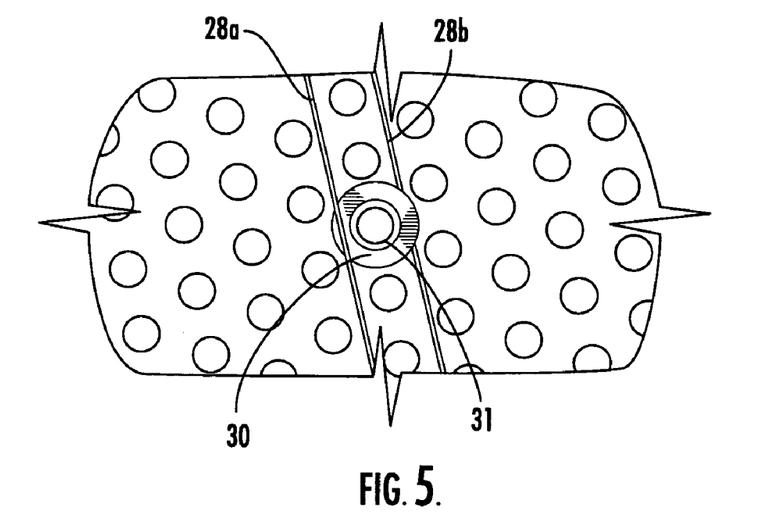
FIG. 5 is a greatly enlarged gage view of a sensor and attached cables for a roll of FIG. 1.

Referring now to FIGS. 5 and 6, the sensors 30 can take any form recognized by those skilled in this art as being suitable for detecting the operational parameter of interest (e.g., stress, strain, pressure or temperature). Exemplary pressure sensors include piezoelectric sensors (particularly piezoelectric sensors formed of piezoelectric ceramic, such as PZT-type lead-zirgonate-titanate, quartz, synthetic quartz, tourmaline, gallium ortho-phosphate, CGG (Ca₃Ga₂Ge₄O₁₄), lithium niobate, lithium tantalite, Rochelle salt, and lithium sulfate-monohydrate), force-resistive sensors, membrane sensors and the like. Notably, each of the sensors 30 includes an internal aperture 31 that is sized to be larger than an associated through hole 82 of the cover 24; a typically dimension of the aperture 31 is between about 0.080 and 0.5 inches. The outer dimension of the sensor 30 is selected so that the sensor 30 does not overlie or extend into any of the surrounding through holes 82; a typical outer dimension of the sensor 30 is between about 0.125 and 0.300 inch. In the illustrated embodiment, the sensors 30 are annular, such that the internal aperture 31 is circular. However, other shapes of sensors and/or apertures may also be suitable. For example, the sensor 30 itself may be square, rectangular, triangular, oval, hexagonal, octagonal, or the like, and the aperture may also take any of these shapes. Alternatively, rather than the aperture 31 being internal to the sensor 30 (i.e., the aperture 31 having a closed perimeter), the aperture 31 may be open-ended, such that the sensor 30 takes a "U" or "C" shape. The sensors 30 are distributed around the circumference of the roll 20 such that they are generally circumferentially equidistant from each other.

Referring again to FIG. 5, the leads 28a, 28b of the sensing system 26 can be any signal-carrying members recognized by those skilled in this art as being suitable for the passage of electrical signals in a suction roll. In the illustrated embodiment, the lead 28a passes below the illustrated sensor 30 on one transverse edge thereof, and the lead 28b passes above the sensor 30 on a diametrically opposed transverse edge thereof. This arrangement is followed for each of the sensors 30. Alternatively, the leads may be positioned on the same surface of the sensor. As another alternative, a wireless system, such as that described in co-pending and co-assigned U.S. patent application Ser. No. 10/977,948, filed 29 Oct. 2004 and entitled Wireless Sensors in Roll Covers (Attorney Docket No. 5690-151), may be employed.

Referring once again to FIG. 1, the processor 32 is typically a personal computer or similar data exchange device, such as the distributive control system of a paper mill, that is operatively associated with the sensors 30 and that can process signals from the sensors 30 into useful, easily understood information. It is preferred that a wireless communication mode, such as RF signaling, be used to transmit the data collected from the sensors 30 to the processing unit 32. Other alternative configurations include slip ring connectors that enable the signals to be transmitted from the sensors 30 to the processor 32. Suitable exemplary processing units are discussed in U.S. Pat. No. 5,562,027 to Moore and U.S. Pat. No. 6,752,908 to Gustafson et al. and U.S. patent application Ser. No. 10/977,948, filed 29 Oct. 2004 and entitled Wireless Sensors in Roll Covers, the disclosures of which are hereby incorporated herein in their entireties.

The suction roll 20 can be manufactured in the manner described below and illustrated in FIGS. 2-9. In this method, initially the shell 22 is covered with a portion of the cover 24 (such as the inner base layer 42a). As can be seen in FIG. 2, the inner base layer 42a can be applied with an extrusion nozzle 40, although the inner base layer 42a may be applied by other techniques known to those skilled in this art. Typically for a suction roll the inner base layer 42a is formed of rubber or epoxy-based composite materials. It will also be understood by those skilled in this art that, although the steps described below and illustrated in FIGS. 3-6 are shown to be performed on an inner base layer 42a, other internal layers of a cover 24 (such as the outer base layer 42b or a tie-in layer) may also serve as the underlying surface for the leads 28a, 28b and sensors 30.

Figure 3:
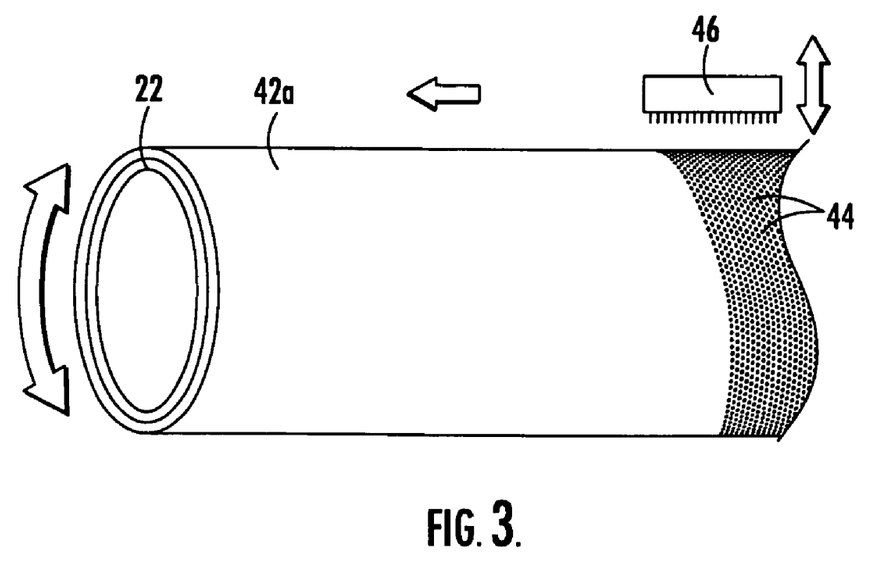
FIG. 3 is a gage perspective view of shell and inner base layer of FIG. 2 being scored with a drill.

Referring now to FIG. 3, the inner base layer 42a of the cover 24 is scored or otherwise marked, for example with a multi-bit drill 46, with score marks 44 that correspond to a desired pattern of holes 82 that will ultimately be formed in the roll 20. The score marks 46 should be of sufficient depth to be visible in order to indicate the locations where holes will ultimately be formed, but need not be any deeper.

Figure 4:
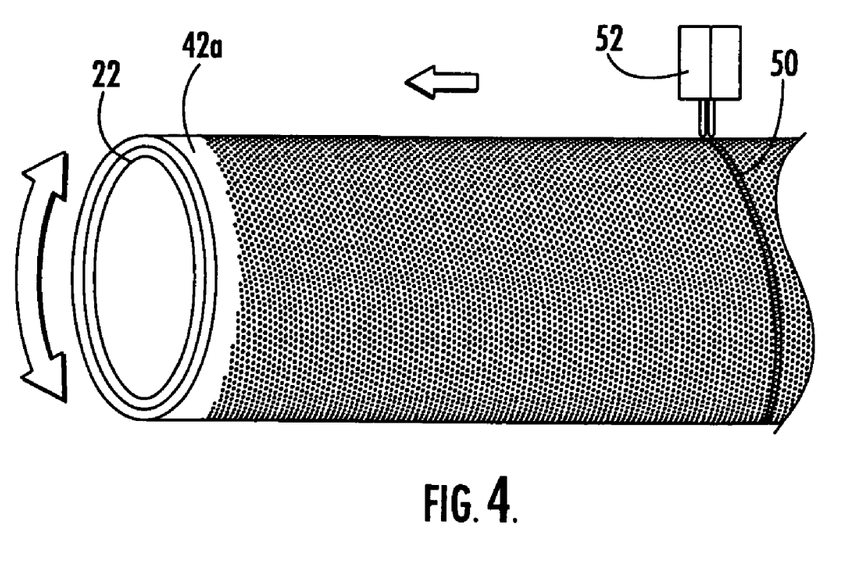
FIG. 4 is a gage perspective view of grooves being formed with a lathe in the inner base layer of FIG. 3.

Turning now to FIG. 4, a pair of continuous helical grooves 50a, 50b are cut into the inner base layer 42a with a cutting device, such as the lathe 52 illustrated herein. The grooves 50a, 50b are formed between the score marks 44 at a depth of about 0.010 inches (it should be deep enough to retain the leads 28a, 28b therein), and should make more than one full revolution of the outer surface of the base layer 42. In some embodiments, the grooves 50a, 50b will be formed at the angle θ defined by the through holes 82 and will be positioned between adjacent columns of holes. In most embodiments, the angle θ is such that the grooves 50a, 50b encircle the inner base layer 42a multiple times; for example, for a roll that has a length of 240 inches, a diameter of 36 inches, and an angle θ of 10 degrees, the grooves 50a, 50b encircle the roll 20 twelve times from end to end.

Referring now to FIG. 5, after the grooves 50a, 50b are formed in the inner base layer 42a, the leads 28a, 28b and sensors 30 of the sensor system 26 are installed. The leads 28a, 28b are helically wound within respective grooves 50a, 50b, with the sensors 30 being positioned closely adjacent to desired locations. The leads 28a, 28b are retained within the grooves 50a, 50b and are thereby prevented from side-to-side movement.

Once the sensors 30 are in desired positions, they can be adhered in place. This may be carried out by any technique known to those skilled in this art; an exemplary technique is adhesive bonding.

Referring now to FIG. 7, once the sensors 30 and leads 28a, 28b have been positioned and affixed to the inner base layer 42a, the remainder of the cover 24 is applied. FIG. 7A illustrates the application of the outer base layer 42b, and FIG. 7B illustrates the application of the top stock layer 70; both of these layers are shown being applied with an extrusion nozzle 72. Those skilled in this art will appreciate that the application of the top stock layer 70 can be carried out by any technique recognized as being suitable for such application. In a typical suction roll, the outer base layer 42b is formed of rubber or epoxy-based composite materials and the topstock layer 70 is formed of rubber or polyurethane. As noted above, the present invention is intended to include rolls having covers that include only a base layer and top stock layer as well as rolls having covers with additional intermediate layers. Application of the top stock layer 70 is followed by curing, techniques for which are well-known to those skilled in this art and need not be described in detail herein.

Figure 8:
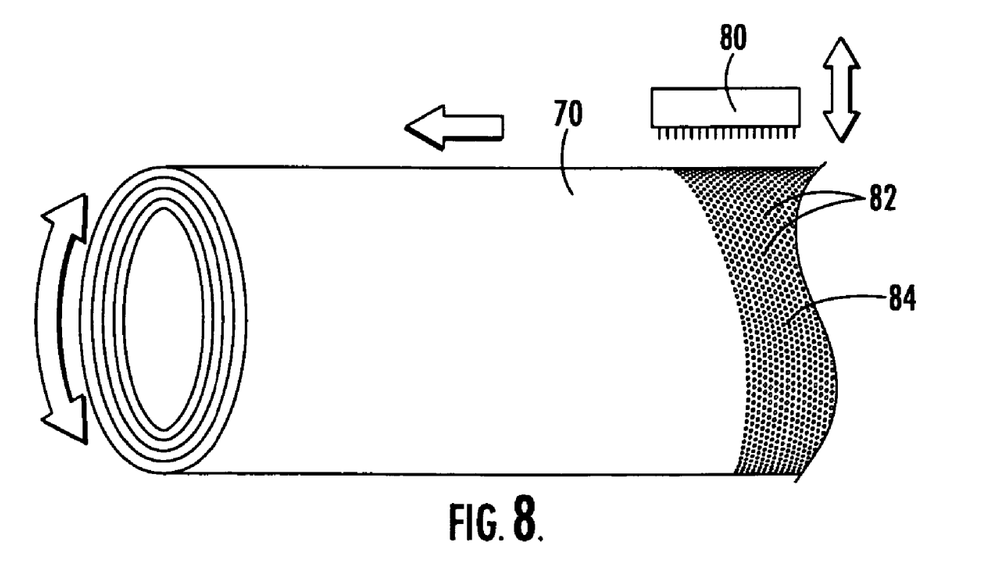
FIG. 8 is a gage perspective view of the topstock layer of FIG. 7B and shell and inner and outer base layers of FIGS. 3 and 7A being drilled with a drill.

Referring now to FIG. 8, after the top stock layer 70 is cured, the through holes 82 and any blind drilled holes are formed in the cover 24 and, in the event that through holes 82 have not already been formed in the shell 22, are also formed therein. The through holes 82 can be formed by any technique known to those skilled in this art, but are preferably formed with a multi-bit drill 80 (an exemplary drill is the DRILL-MATIC machine, available from Safop, Pordenone, Italy). As can be seen in FIG. 6, each of the through holes 82 that is associated with a sensor 30 extends through the aperture 31 in the sensor 30; that is, each of such through holes 82 defines a path that passes through the aperture 31 of the associated sensor 31.

Because the hole pattern may define the path that the leads 28a, 28b (and, in turn, the grooves 50a, 50b) can follow, in some rolls conventional placement of the sensors 30 (i.e., evenly spaced axially and circumferentially, and in a single helix) may not be possible. As such, one must determine which axial and circumferential positions are available for a particular roll. Variables that can impact the positioning of sensors include the size of the roll (the length, diameter and/or circumference) and the angle θ defined by the hole pattern. Specifically, the relationships between these variables can be described in the manner discussed in the aforementioned U.S. Patent Publication No. 20040053758, the disclosure of which is incorporated hereinabove in its entirety.

It can be seen that embodiments of sensors described above can address some of the issues presented by suction rolls. By including an aperture in the sensor through which the through holes can extend, rolls of the present invention can avoid interfering with the hole patterns of suction rolls and need not have blind drilled holes in positions over the sensors.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. An industrial roll system, comprising:
    a substantially cylindrical shell having an outer surface and an internal lumen;
    a polymeric cover circumferentially overlying the shell outer surface, wherein the shell and cover have a plurality of through holes that provide fluid communication between the lumen and the atmosphere; and
    a sensing system comprising:
        a plurality of sensors contacting the cover, the sensors configured to sense an operating parameter of the roll and provide signals related to the operating parameter, wherein at least some of the sensors include an aperture, wherein some of the through holes of the cover extend through respective apertures of the sensors; and
        a processor operatively associated with the sensors that processes signals provided by the sensors;
    wherein the apertures are internal apertures.

2. The industrial roll system defined in claim 1, wherein the sensors are embedded in the cover.

3. The industrial roll system defined in claim 1, wherein the sensors are generally circular.

4. The industrial roll system defined in claim 1, wherein the sensors are formed of a piezoelectric material.

5. The industrial roll system defined in claim 4, wherein the sensing system further comprises at least two electrical leads that interconnect each of the plurality of sensors.

6. The industrial roll system defined in claim 5, wherein one of the electrical leads contacts a top surface of one of the sensors, and the other of the electrical leads contacts a bottom surface of that sensor.

7. The industrial roll system defined in claim 4, wherein the piezoelectric material comprises piezoelectric ceramic.

8. The industrial roll system defined in claim 1, wherein the sensor is configured to sense pressure.

9. The industrial roll system defined in claim 1, wherein the cover includes a base layer that circumferentially overlies the shell and a topstock layer that circumferentially overlies the base layer, and wherein the sensors are embedded in the base layer.

10. The industrial roll system defined in claim 9, wherein the base layer includes an inner base layer and an outer base layer, and wherein the sensors are disposed to overlie the inner base layer and underlie the outer base layer.

11. The industrial roll system defined in claim 9, wherein the base layer comprises rubber or an epoxy-based composite material.

12. The industrial roll system defined in claim 9, wherein the topstock layer is formed of a material selected from the group consisting of: rubber and polyurethane.

13. An industrial roll system, comprising:
    a substantially cylindrical shell having an outer surface and an internal lumen;
    a polymeric cover circumferentially overlying the shell outer surface, wherein the shell and cover have a plurality of through holes that provide fluid communication between the lumen and the atmosphere; and
    a sensing system comprising:
        a plurality of piezoelectric sensors embedded in the cover, the sensors configured to sense an operating parameter of the roll and provide signals related to the operating parameter, wherein at least some of the sensors include an internal aperture, wherein some of the through holes of the cover extend through respective internal apertures of the sensors; and
        a processor operatively associated with the sensors that processes signals provided by the sensors.

14. The industrial roll system defined in claim 13, wherein the sensors are generally circular.

15. The industrial roll system defined in claim 13, wherein the sensing system further comprises at least two electrical leads that interconnect each of the plurality of sensors.

16. The industrial roll system defined in claim 15, wherein one of the electrical leads contacts a top surface of one of the sensors, and the other of the electrical leads contacts a bottom surface of that sensor.

17. The industrial roll system defined in claim 13, wherein the piezoelectric material comprises piezoelectric ceramic.

18. The industrial roll system defined in claim 13, wherein the cover includes a base layer that circumferentially overlies the shell and a topstock layer that circumferentially overlies the base layer, and wherein the sensors are embedded in the base layer.

19. The industrial roll system defined in claim 18, wherein the base layer includes an inner base layer and an outer base layer, and wherein the sensors are disposed to overlie the inner base layer and underlie the outer base layer.

20. The industrial roll system defined in claim 18, wherein the base layer comprises rubber or an epoxy-based composite.

21. The industrial roll system defined in claim 18, wherein the topstock layer is formed of a material selected from the group consisting of: rubber and polyurethane.

22. An industrial roll, comprising:
    a substantially cylindrical shell having an outer surface and an internal lumen;
    a polymeric cover circumferentially overlying the shell outer surface; and
    a sending system comprising:

a plurality of sensors embedded in the cover, the sensors configured to sense an operating parameter of the roll and provide signals related to the operating parameter, wherein at least some of the sensors include an aperture; and a processor operatively associated with the sensors that processes signals provided by the sensors;

wherein the shell and cover have a plurality of through holes that provide fluid communication between the lumen and the atmosphere; and wherein some of the through holes of the cover extend through respective apertures of the sensors; and wherein the apertures are internal apertures.

* * * * *

UNITED STATES PATENT AND TRADEMARK OFFICE
CERTIFICATE OF CORRECTION

PATENT NO.         : 7,572,214 B2                                           Page 1 of 1
APPLICATION NO.    : 11/121577
DATED              : August 11, 2009
INVENTOR(S)        : Gustafson

It is certified that error appears in the above-identified patent and that said Letters Patent is hereby corrected as shown below:

On the Title Page
(73) Inventor: Please correct "Stevens City, VA" to read -- Winchester, VA --.

In the Claims
Column 8, Claim 17, Line 46: Please correct "material" to read -- sensors --.

Signed and Sealed this

Sixth Day of October, 2009

David J. Kappos
*Director of the United States Patent and Trademark Office*